March 11, 1969     C. D. CUPP     3,431,931
VALVE ASSEMBLY FOR BREATHING APPARATUS
Original Filed Feb. 1, 1963
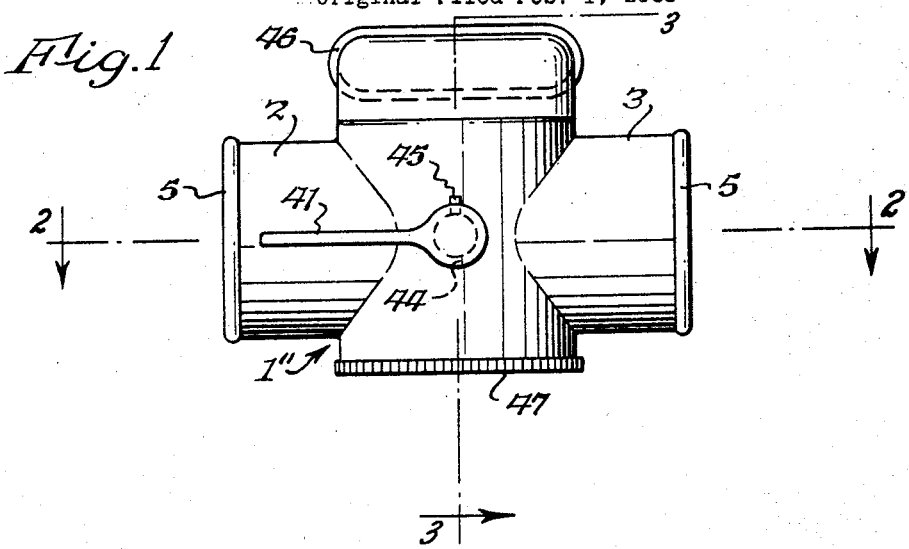
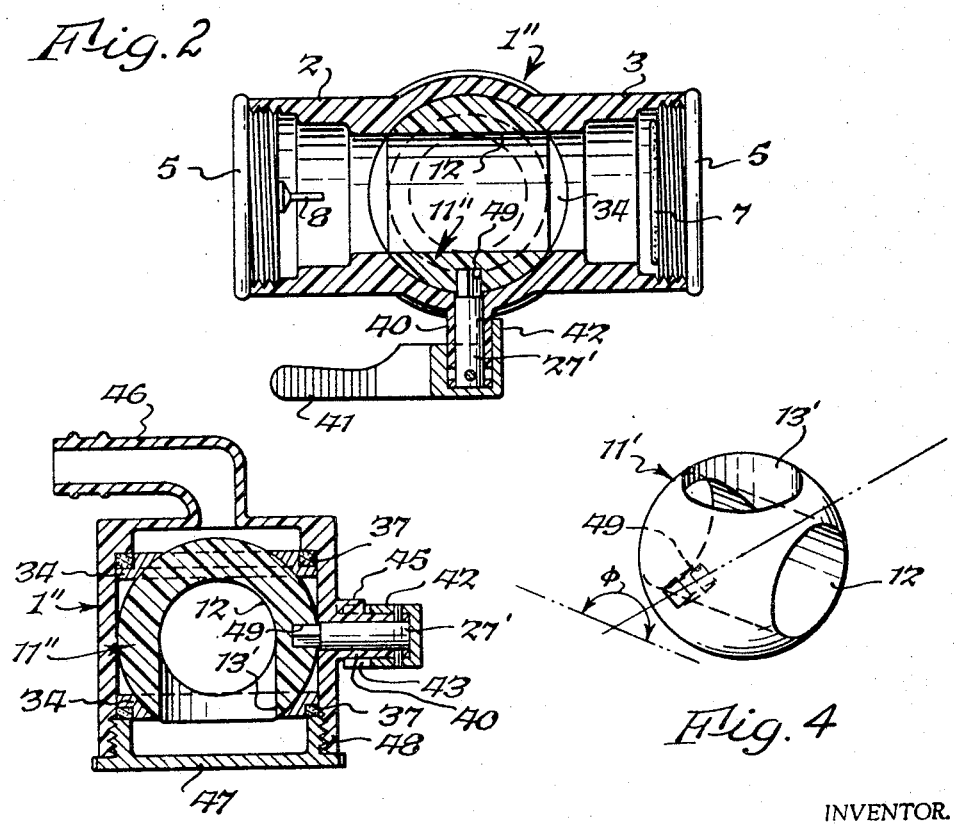
INVENTOR.
Charles D. Cupp
BY
Christel & Bean
ATTORNEYS.

United States Patent Office 3,431,931
Patented Mar. 11, 1969

3,431,931
VALVE ASSEMBLY FOR BREATHING APPARATUS
Charles D. Cupp, Lancaster, N.Y., assignor, by mesne assignments, to Automatic Sprinkler Corporation of America, Cleveland, Ohio, a corporation of Ohio
Original application Feb. 1, 1963, Ser. No. 255,486, now Patent No. 3,256,910, dated June 21, 1966. Divided and this application Aug. 30, 1965, Ser. No. 545,170
U.S. Cl. 137—102   5 Claims
Int. Cl. G05d 7/00; A61m 15/00; F16k 31/60

ABSTRACT OF THE DISCLOSURE

A valve body has opposed inhalation and exhalation passages and a lateral breathing passage. A rotary valve ball having a through bore communicating with the inhalation and exhalation passages and a lateral bore is movable about an axis normal to a plane containing the axes of the bores between positions placing the lateral bore in and out of communication with the breathing passage. A pair of opposed journal members have semispherical bearing surfaces in sliding engagement with the ball, and drive means are operatively associated with the ball for moving it. One of the journal members encircles and seals the lateral bore in the valve position placing it in communication with the breathing passage, and seals all of the bores from the breathing passage in the other position of the ball.

---

This application is a division of my pending application Ser. No. 255,486, filed Feb. 1, 1963, and now Patent No. 3,256,910 for Valve Assembly for Breathing Apparatus.

This invention relates generally to the valve art, and more specifically to a new and useful valve assembly particularly adapted for use in breathing apparatus.

It is sometimes desired to provide a shutoff valve in the T assembly connected to the mouthbit or face mask, as the case may be, of a breathing apparatus. For example, when used in conjunction with underwater exploration, the user will remove the mouthbit or mask upon surfacing. If the T assembly remains open, there is danger of water passing into the apparatus.

Accordingly, the primary object of my invention is to provide a shutoff valve for breathing apparatus T assemblies and the like, whereby the user can quickly interrupt communication between the breathing passage and the hose connections.

Another object of my invention is to provide the foregoing in a simple, readily assembled, durable, dependable, relatively inexpensive, and lightweight construction.

In one aspect thereof, a breathing apparatus valve assembly constructed in accordance with my invention is characterized by the provision of a valve body having first and second passages, a valve ball having first and second bores communicating with each other and with the first and second body passages when the ball is in one position, and means mounting the ball for rotation in a direction interrupting communication between one of the bores and the passage associated therewith, these last-named means including generally opposite journal members for sliding engagement with the ball, with one of the journal members having an annular bearing surface encircling the one ball in the one position of the ball and sealing the bore from the one passage when the ball is in another rotary position.

The foregoing and other objects, advantages and characterizing features of the valve assembly of my invention will become more clearly apparent from the ensuing detailed description considered in conjunction with the accompanying drawing wherein like reference numerals denote like parts throughout, and wherein:

FIG. 1 is a front elevational view of one form of valve assembly of my invention;

FIG. 2 is a view thereof, partly in plan and partly in horizontal section taken about on line 2—2 of FIG. 1;

FIG. 3 is a vertical sectional view thereof, taken about on line 3—3 of FIG. 1; and FIG. 4 is a perspective view of the valve ball.

The valve body 1″ has inhalation and exhalation sections 3 and 2. The breathing passage is in a bent section 46 which can be connected either to a mouthbit or to a mask. The journals 34 are held assembled by a cover 47 threaded into a section 48 of housing 1″, opposite to breathing section 46.

In this arrangement the ball 11′ is rotated a greater angular distance $\phi$ (FIG. 4) to shift the radial bore 13′ out of communication with breathing section 46, to the position shown in FIG. 3 in which both bores are out of communication with the breathing section.

The valve of this embodiment is assembled in the following manner. First a journal 34, then ball 11′ and finally the second journal 34 are inserted in the lateral body, following which the cap 47 is threaded into place. However, the stem 27′ must be inserted in the socket 49 provided in ball 11′ after the ball has been positioned in the body.

Thus, there is provided a ball journal in a pair of members providing a seal.

Accordingly, it is seen that my invention fully accomplishes its intended objects.

Having fully disclosed and completely described my invention, and its mode of operation, what I claim as new is:

1. A valve assembly for breathing apparatus comprising, a valve body having opposed inhalation and exhalation passages and a lateral breathing passage, inhalation and exhalation check valves arranged in said inhalation and exhalation passages to permit only inhalation through the former and only exhalation through the latter,
   a rotary valve ball having a diametral bore communicating with said inhalation and exhalation passages and a radial bore communicating with said breathing passage in one position of said ball, and means mounting said ball for rotation about an axis normal to the plane defined by the axes of said bores to position said radial bore out of communication with said breathing passage, said last-named means including opposed annular journal means having semispherical bearing surfaces in sliding engagement with said ball, one of said journal members comprising an annulus encircling said radial bore in said one position of said bore and sealing said bores from said breathing passage in another rotary position of said ball.

2. A valve assembly for breathing apparatus comprising a valve body having opposed inhalation and exhalation passages and a lateral breathing passage, inhalation and exhalation check valves arranged in said inhalation and exhalation passages to permit only inhalation through the former and only exhalation through the latter, a rotary valve ball having a through bore communicating with said inhalation and exhalation passages and a lateral bore communicating with said through bore and with said breathing passage in one position of said ball, and means mounting said valve ball for rotation about an axis normal to a plane containing the axes of said bores to another position wherein said lateral bore is out of communication with said breathing passage, said mounting means including a pair of opposed journal members carried by said body and each having a semispherical bearing surface in sliding engagement with said ball, one of said journal members comprising an annulus encircling and sealing said lateral bore in said one position of said ball and sealing all of said bores from said breathing passage in said other position of said ball, a drive means operatively associated with said ball for moving the same.

3. A valve assembly as in claim 2 wherein said through bore communicates with said inhalation and exhalation passages both in said one position and in said other position of said ball.

4. A valve assembly as in claim 2, together with seals carried by said journal members in sealing engagement with said body.

5. A valve assembly as set forth in claim 4, said body including a member clamping said journal members against said ball.

References Cited

UNITED STATES PATENTS

| | | | |
|---|---|---|---|
| 2,698,731 | 1/1955 | Koehler et al. | 25—172 |
| 1,670,691 | 5/1928 | Riggin | 251—315 |
| 2,905,197 | 9/1959 | Janes | 137—625.47 |

FOREIGN PATENTS

| | | |
|---|---|---|
| 563,258 | 9/1958 | Canada. |
| 292,480 | 8/1919 | Germany. |
| 1,353 | 3/1914 | Great Britain. |
| 746,794 | 3/1956 | Great Britain. |

WILLIAM F. O'DEA, *Primary Examiner.*